United States Patent
Pyntikov et al.

(10) Patent No.: US 6,384,496 B1
(45) Date of Patent: May 7, 2002

(54) MULTIPLE MAGNETIC PATH ELECTRIC MOTOR

(75) Inventors: Alexander V. Pyntikov, Ashburn; Boris A. Maslov, Reston, both of VA (US)

(73) Assignee: Wavecrest Laboratories, LLC, Herndon, VA (US)

(*) Notice: Subject to any disclaimer, the term of this patent is extended or adjusted under 35 U.S.C. 154(b) by 0 days.

(21) Appl. No.: 09/571,174

(22) Filed: May 16, 2000

Related U.S. Application Data

(60) Provisional application No. 60/134,774, filed on May 17, 1999.

(51) Int. Cl.[7] .................. H02K 21/12; H02K 29/06
(52) U.S. Cl. .................. 310/68 B; 310/154.01; 310/154.45; 310/269; 310/254; 318/254
(58) Field of Search ................ 310/269, 185, 310/131, 177, 198, 254, 68 B; 318/254

(56) References Cited

U.S. PATENT DOCUMENTS

| | | | |
|---|---|---|---|
| 3,663,850 A | * 5/1972 | Phelon | 310/153 |
| 4,315,171 A | 2/1982 | Schaeffer | |
| 4,355,249 A | * 10/1982 | Kenwell | 310/49 R |
| 4,458,168 A | 7/1984 | Welburn | |
| 4,491,769 A | 1/1985 | Heidelberg | |
| 4,511,831 A | 4/1985 | McInnis | |
| 4,754,207 A | * 6/1988 | Heidelberg et al. | 318/254 |
| 5,105,111 A | 4/1992 | Luebke | |
| 5,111,096 A | 5/1992 | Horst | |
| 5,130,595 A | 7/1992 | Arora | |
| 5,164,623 A | 11/1992 | Shkondin | |
| 5,212,419 A | 5/1993 | Fisher et al. | |
| 5,545,936 A | 8/1996 | Davenport | |
| 5,554,903 A | * 9/1996 | Takara | 310/266 |
| 5,646,464 A | 7/1997 | Sickafus | |
| 5,736,829 A | 4/1998 | Goff | |
| 5,777,418 A | 7/1998 | Lange et al. | |
| 5,801,473 A | 9/1998 | Helwig | |
| 5,903,082 A | 5/1999 | Caamano | |
| 5,955,814 A | 9/1999 | Fujiwara | |
| 6,094,011 A | * 7/2000 | Notsu | 315/78 |

* cited by examiner

*Primary Examiner*—Burton S. Mullins
(74) *Attorney, Agent, or Firm*—McDermott, Will & Emery

(57) ABSTRACT

A rotary electric motor in which a stator comprises a first number of permanent magnet poles substantially similar to each other in configuration and spaced substantially equidistantly with alternating polarity along a radial air gap, and a rotor that comprises a second number of salient poles distributed along the radial air gap, the salient poles divided in groups that have magnetic circuits isolated from each other. The radial distance between rotor salient poles of each group and the radial difference between the stator permanent magnet poles are substantially the same.

5 Claims, 4 Drawing Sheets

MULTIPLE MAGNETIC PATH ELECTRIC MOTOR

RELATED APPLICATION

The present application claims priority of U.S. provisional patent application No. 60/134,774, filed May 17, 1999, and incorporated by reference in the present application.

FIELD OF THE INVENTION

The present invention relates to direct current motor structure, more particularly to a motor having a permanent magnet stator and a rotor comprising a plurality of isolated sections of magnetizable material, each bearing windings that are energized independently of other rotor winding sections in accordance with rotor position with respect to the stator.

BACKGROUND

Direct current motors have versatility in a wide range of applications. The availability of a battery power source for dc motor equipped devices facilitates a portability aspect that is not readily available for a-c motor drives. As development of the battery has progressed, the challenge of providing efficient direct current motor drives for vehicles, as a viable alternative to combustion engines, has become more compelling.

U.S. Pat. No. 5,164,623 to Shkondin describes mounting of a motor on the wheel of a vehicle for directly driving the vehicle. Shkondin contemplates application of such an arrangement to electric cars, bicycles, wheelchairs and the like. U.S. Pat. No. 4,754,207 to Heidelberg et al. recognizes a variety of applications in which electronically controlled motors have become increasingly important.

Heidelberg et al. provide a dc motor having a rotor comprising a continuous ring of a plurality of permanent magnets successively alternating in polarity. The stator comprises a plurality of individually switchable electromagnet poles disposed to be circumferentially separated from the rotor magnets by a radial air gap. Several adjacent electromagnets form a phase group. The radially inward base portions of adjacent electromagnet poles in each group are in surface area contact with each other to form a magnetic flux path. The electromagnetic circuit is broken at the transition points between adjacent groups of electromagnets. Sensors detect relative rotational position between rotor and stator elements to control electronic switching of the individual electromagnet windings. Electromagnets belonging to a common group are switched simultaneously with one common electronic switching means per group. Windings of the electromagnets in adjacent groups are different phases and are switched at different times.

Of concern in implementation of stator winding switched energization is the avoidance of unfavorable consequences such as rotation irregularities. For example, simultaneous switching of all motor phase windings can cause pulsating output torque. Alleviation of these effects, with varying success, can be obtained by appropriately switching all phases at different times or by simultaneously switching certain winding combinations that are distributed symmetrically about the stator periphery and bear certain positional relationships with the permanent magnet poles of the rotor. However, switching of adjacent windings at different times leads to detrimental effects if the windings are linked to a continuous magnetic circuit path. Heidelberg et al. addresses this problem by grouping stator poles in separate magnetic circuit paths. However, such arrangement has an irregular stator pole geometry that requires some poles being wound differently from others. This configuration complicates the manufacturing process and compromises motor efficiency.

The need remains for an improved motor amenable to simplified manufacture and capable of efficient flexible operating characteristics.

DISCLOSURE OF THE INVENTION

The present invention fulfills the above-described needs, at least in part, in the provision of a rotary electric motor in which a stator comprises a first number of permanent magnet poles substantially similar to each other in configuration and spaced substantially equidistantly with alternating polarity along a radial air gap, and a rotor that comprises a second number of salient poles distributed along the radial air gap, the salient poles divided in groups that have magnetic circuits isolated from each other. Although specific numbers of stator and rotor poles are illustrated, the invention is applicable to other embodiments having different numbers of stator and rotor poles. The rotor pole groups are distributed equidistantly along the radial air gap. Windings of each group of salient poles are individually switchably energized in accordance with relative position between the stator and rotor so that magnetic polarities of the salient poles are changed to provide rotation. The switching may be performed by a mechanical commutator or by electronic switches activated in response to position sensing signals.

One aspect of the invention is that all of the rotor salient poles are of substantially the same dimension. The magnetic paths between pole groups are discontinuous. Each group of salient poles that forms a complete magnetic circuit path may comprise two adjacent poles with windings arranged, when energized, for effecting opposite magnetic polarity for the two adjacent poles. When switchably energized, current in the opposite direction in the windings effects a reversal of the magnetic polarities. Alternatively, each isolated magnetic circuit rotor group may comprise a number of salient poles other than two, as long as all adjacent poles when magnetized are of opposite polarity. For example, each salient pole can form a group isolated from the others. Switching energization for all of the windings is appropriately timed to effect smooth operation.

Preferably, the rotor salient pole faces and the stator permanent magnet pole faces are of the same radial dimension. The radial distance between salient poles of each rotor group is the same for all groups and substantially the same as the radial distance between stator poles. The rotor pole groups are distributed equidistantly about the radial air gap. As the total number of rotor salient poles need not be equal to the total number of stator permanent magnet poles and the radial distance between adjacent poles of different groups is constant, this distance need not be the same as the distance between poles of the same group.

In a preferred embodiment, the direct current motor has an inner stator and outer rotor that radially surrounds the stator. Alternatively, the outer rotor may comprise a permanent magnet annular ring with the switched salient pole windings configured on the inner stator. In the latter case, the stator poles would form groups of isolated magnetic circuits.

The present invention thus has advantages of simplified manufacture, as the salient poles can be uniformly wound, and the pole sizes can be uniform for both stator and rotor. In addition, efficient and smooth motor operation can be obtained.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
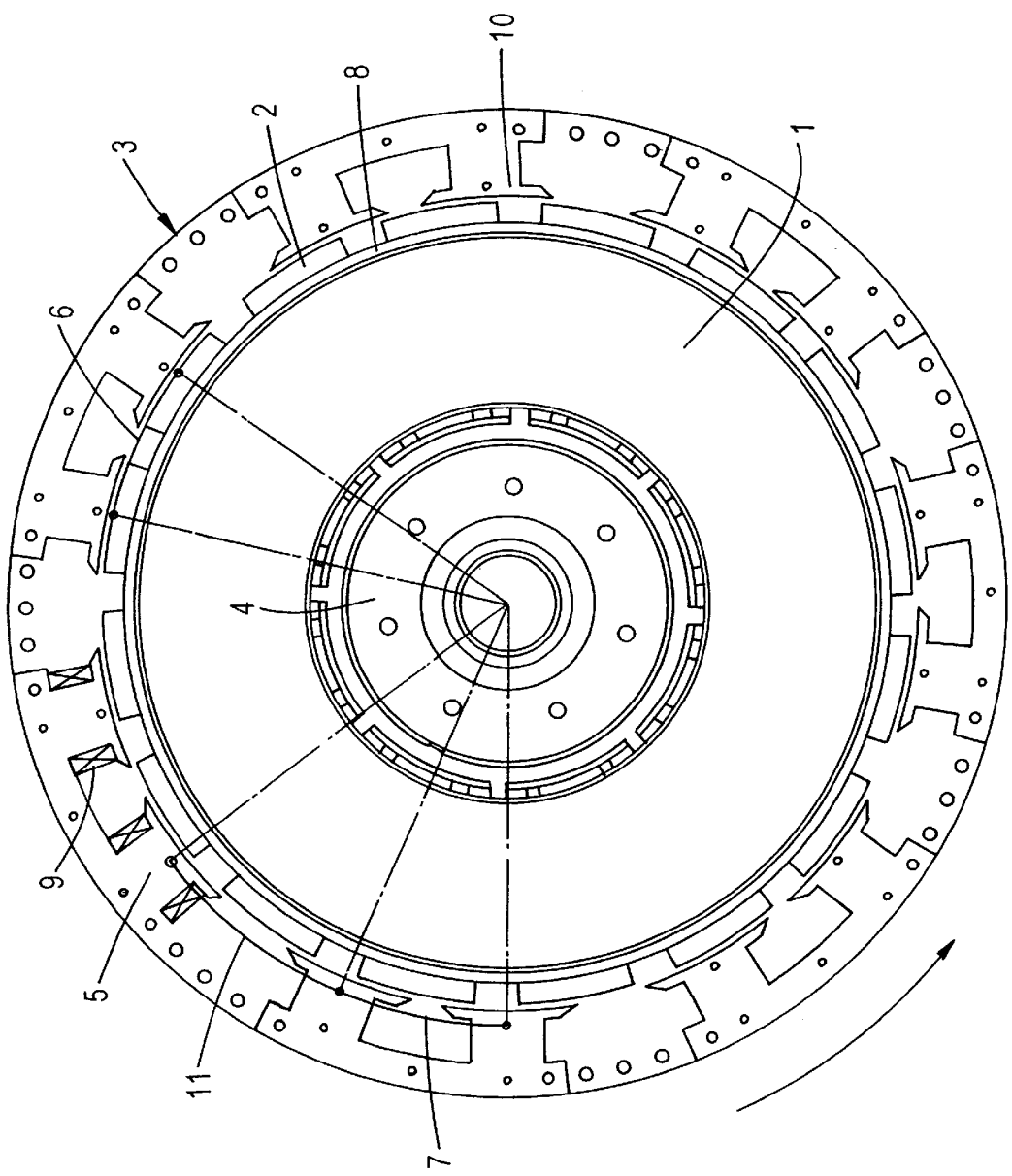
FIG. 1 is a cross-section layout of stator and rotor poles in accordance with the present invention.

FIG. 1 is a cross section view of a preferred embodiment of the present invention. Stator 1 comprises a plurality of permanent magnet poles 2, spaced equidistantly about its outer peripheral radial extent. The polarity of the magnets alternates along the air gap. Radially inside of the circular row of permanent magnets is a cylindrical, magnetically conductive element 8 that forms a magnetic return path for the permanent magnets. Surrounding the stator is annular rotor 3, which comprises groups of salient wound poles 5, the groups equidistantly spaced about the stator and separated therefrom by a radial air gap. Each salient pole 10 has a pole face of the same dimension. Each of the rotor groups is a magnetic core structure that interconnects two salient poles and is magnetically isolated from adjacent core groups. The radial spacing between adjacent pole groups is the same throughout the radial air gap periphery. It is to be understood that, while sixteen stator permanent magnets and seven rotor groups of two salient poles each are shown, this figure is merely illustrative of one of many configurations having different numbers of poles but similar relative positions. Switching assembly 4 provides the switched energization timing for the rotor windings.

The rotor arrangement in essence comprises individual electromagnet groups having windings 9. The electromagnet groups do not have a common magnetic path with each other for the return of a magnetic field. That is, each electromagnet group is an individual magnetic circuit unrelated to the other rotor groups. Distance 7, between poles of each electromagnet group, differs from the distance 11 between adjacent poles of different groups. The isolation of the magnetic circuits of the rotor prevents distortions during switching.

Figure 2:
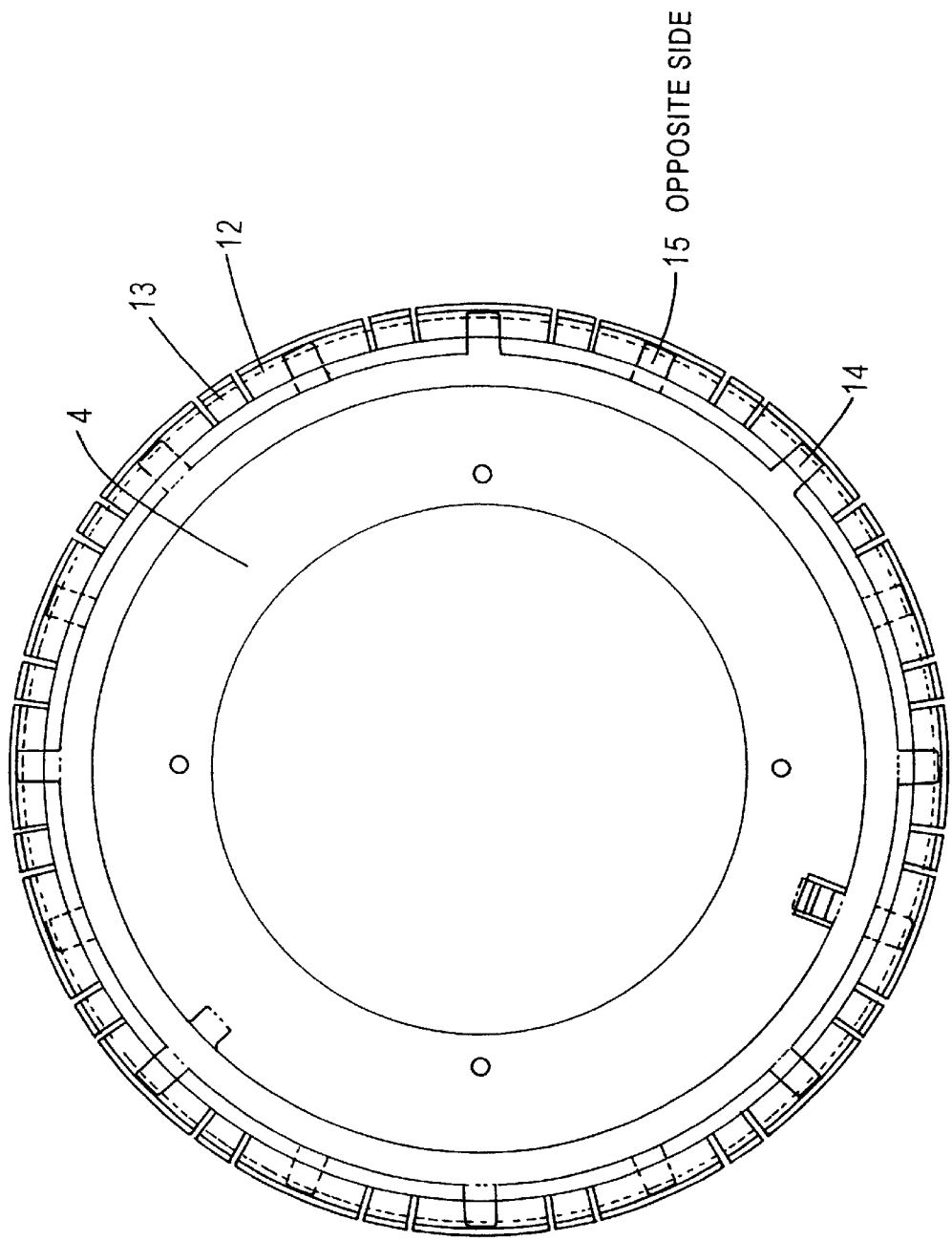
FIG. 2 is a cross-section of a switching assembly for winding energization in accordance with the present invention.

As shown in FIG. 2, the switching assembly comprises sixteen electric contact groups 12 connected alternatively to electrically conductive rings 14 and 15, which in turn are connected to a DC power source. Spaced between groups 12 are portions 13, which are not electrically connected to the source and function to separate electric contact groups 12 from each other. The timed switched winding energization operation is described in detail hereinafter with respect to FIG. 5.

Figure 3:
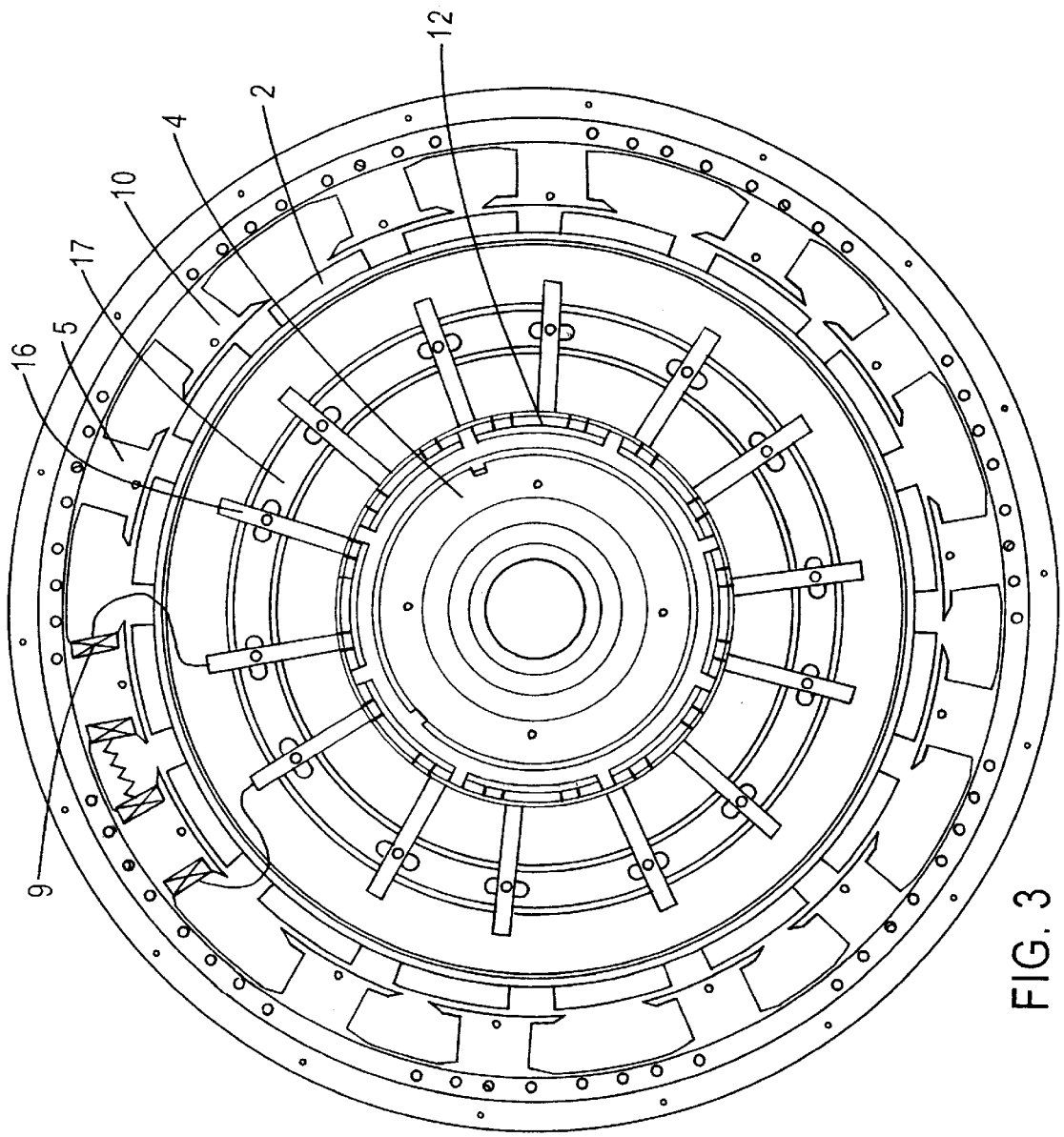
FIG. 3 is a more detailed layout illustrative of interaction between the switching assembly and the motor windings in accordance with the present invention.

The relationship and interaction between the switching assembly and the motor windings is more fully illustrated in FIG. 3. Windings 9 of the rotor poles 10 are connected to the electric brushes 16 attached to the ring 17, which is a part of a rotor assembly and rotates together with the rotor. The windings are connected appropriately to the brushes to provide electromotive force commutation for the desired direction of rotation. Switching assembly 4 is affixed to the stator and, therefore, stationary. When the relative position of a rotor pole 10 changes with reference to the position of a stator pole 2, the positions of the brushes also change with reference to the position of electric contact groups 12.

Figure 4:
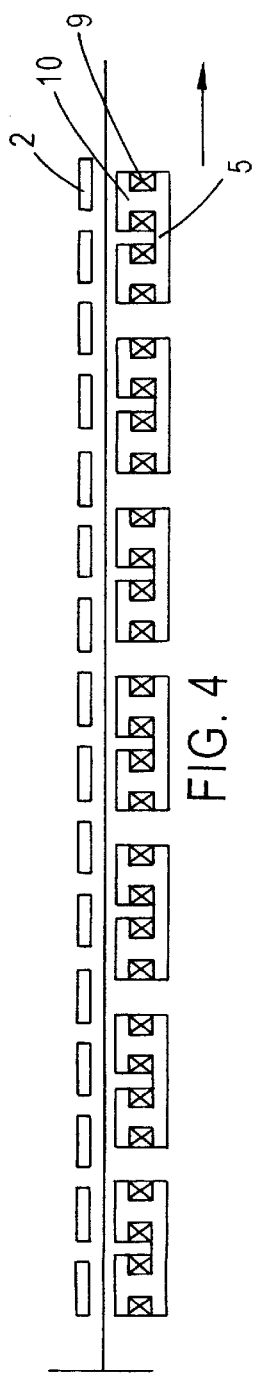
FIG. 4 is a developed view of an air gap area in accordance with the present invention.
Figure 5:
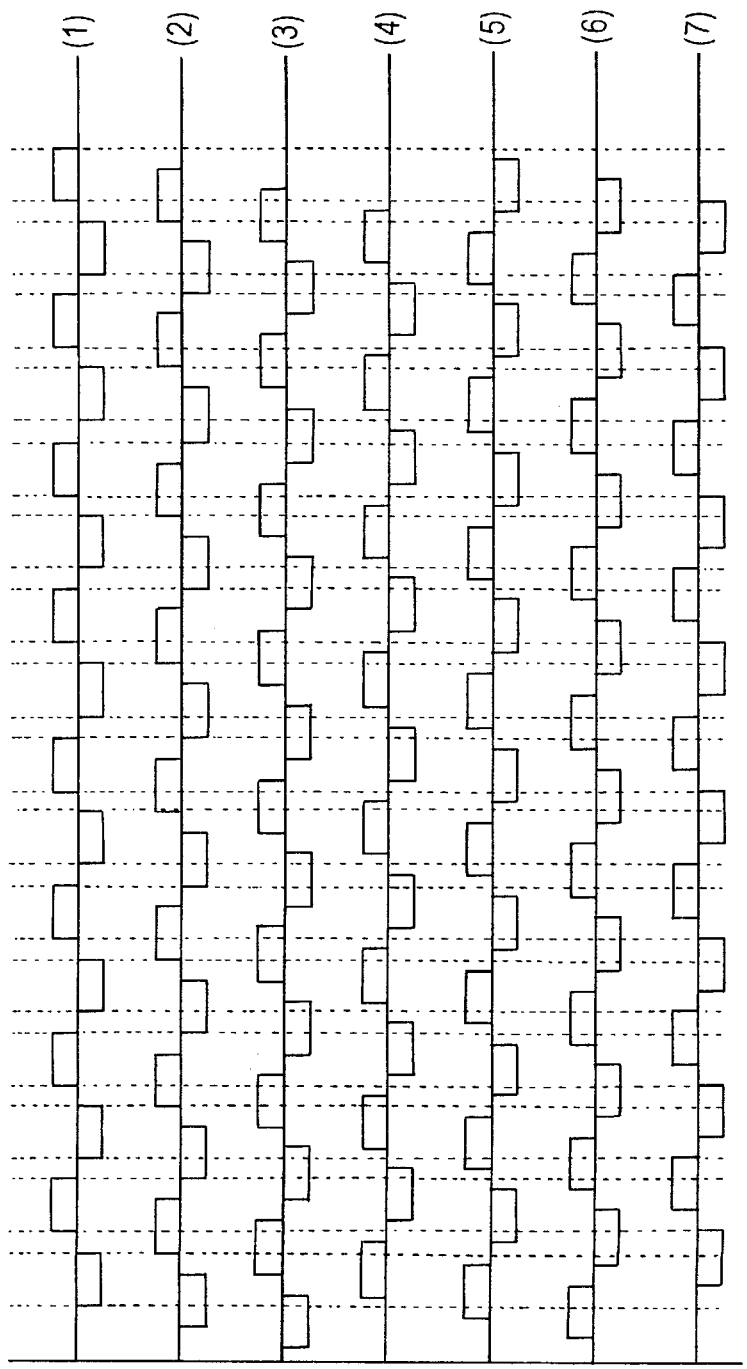
FIG. 5 is a timing diagram for demonstrating winding energization polarities relative to the winding layout of FIG. 4.

Appropriate motor winding switched energization, obtained with the above described arrangement, is more specifically explained with respect to FIGS. 4 and 5. FIG. 4 presents a layout view of the rotor and stator poles along the air gap of the motor. This layout corresponds to the structure illustrated in FIG. 1. Seven rotor pole groups 5 each comprise two poles 10 with windings wound oppositely. The distance between poles in each group is the same and substantially equal to the distance between each of the sixteen permanent magnet stator poles 2. As there can be more stator poles than rotor poles, the distance between groups of poles can be greater than the distance between poles within a group. The position of rotor poles 10 relative to the location of stator poles 2 determines timing of the switching of electromagnets 5.

FIG. 5 is a diagram representing the timed energization of each electromagnet of the motor. Each horizontal plot (1)–(7) represents the energization of a respective rotor electromagnet pole group over a time period extending over the horizontal direction of the plot. As can be seen from this figure, a winding may be energized with a positive or negative polarity or unenergized at any particular time. Windings are non-energized when their poles are directly opposite stator permanent magnets. By temporarily disconnecting the windings of electromagnets from the current source, a polarity change transition period is facilitated.

As a specific example, in the time period between the first two vertical dotted lines, the winding group energizations are as follows: winding group 1 is energized with negative relative polarity throughout the period; winding group 2 is energized with negative relative polarity until a latter portion of the period and unenergized for the remainder of the period; winding group 3 is energized with negative relative polarity for a beginning portion of the period, unenergized thereafter, and energized with positive relative polarity in the remainder of the period; winding group 4 is energized with positive relative polarity in an early portion of the period; winding group 5 is energized with negative relative polarity until the latter part of the period and then unenergized; winding group 6 is energized with positive relative polarity for a beginning portion of the period, unenergized thereafter, and energized with negative relative polarity in the remainder of the period; winding group 7 is unenergized at the beginning of the period and energized with negative relative polarity during the period. The winding groups are sequentially energized and de-energized thereafter as illustrated. This switching pattern, as well as the interrupted magnetic paths between winding groups, provides efficient smooth motor operation and decreases energy losses.

In this disclosure there is shown and described only the preferred embodiment of the invention and but a few examples of its versatility. It is to be understood that the invention is capable of use in various other combinations and environments and is capable of changes or modifications within the scope of the inventive concept as expressed herein. For example, as can be appreciated, an electronic switching arrangement can be used in place of the switchable commutator arrangement described. With electronic switching means responsive to position sensing and electronic commutation, the non-energized periods may be varied in time to achieve maximum efficiency of the motor.

As can be readily appreciated, different numbers of stator and rotor poles may be used. The ratio of the number of stator poles to rotor poles may be changed, the distance between adjacent poles of different rotor pole groups being changed accordingly to maintain the rotor groups equidistantly distributed around the air gap periphery. Each rotor salient pole group may comprise a single pole and the switching arrangement changed to provide energization in accordance with the above disclosed operation.

While the invention has been illustrated as an inner stator surrounded by an outer rotor, these elements can be reversed so that the rotor is surrounded by the stator. Additionally, while the motor has been described above as containing permanent magnets on the stator and electromagnetic windings on the rotor, these elements can be reversed so that the permanent magnets are carried by the rotor and the stator comprises the salient pole windings. Also, the stator permanent magnets need not have a common magnetic return path, but may be isolated from each other.

What is claimed is:

1. A rotary electric motor having a stator and a rotor separated from each other by a radial air gap for electromotive interaction therebetween, wherein said stator comprises a first number of permanent magnet poles substantially similar to each other in configuration and being positioned substantially equidistantly with alternating polarity along the radial air gap, the permanent magnet poles being spaced from each other;

said rotor comprising a second number of salient poles divided in groups that are distributed equidistantly along the radial air gap, the groups comprising magnetic circuits isolated from each other, the salient poles having windings thereon, the rotor salient poles and the stator poles all having pole faces of approximately the same length along the air gap; and position sensing and switching means for applying energization current to and withholding energization current from the windings of each group of salient poles in accordance with relative position between the stator and rotor; wherein each of the stator permanent magnet poles is a magnetic structure that is ferromagnetically isolated from adjacent permanent magnet poles.

2. A motor as recited in claim 1, wherein each said rotor group comprises two salient poles, having opposite polarities when the windings thereof are energized.

3. A motor as recited in claim 2, wherein the polarities of the two salient poles are changed by switching off energization current flow in the windings and thereafter switching on energization current flow in the windings in an opposite direction in response to the position sensing means.

4. A motor as recited in claim 1, wherein the rotor surrounds the stator.

5. A motor as recited in claim 1, wherein energization current is withheld from the windings of at least one of said rotor groups at any particular time in the course of motor operation.

* * * * *